United States Patent Office
3,388,608
Patented June 18, 1968

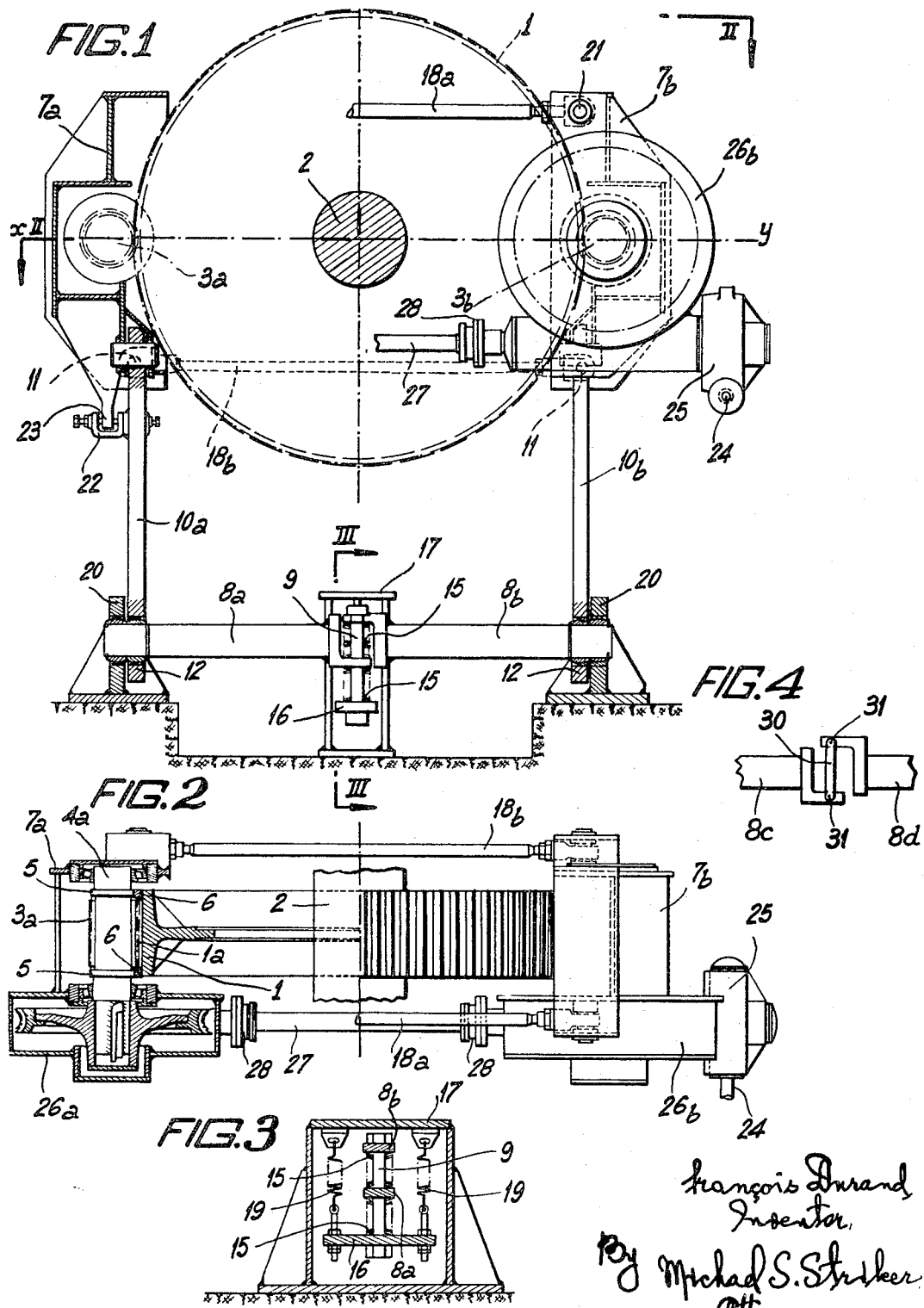

3,388,608
DEVICE FOR TRANSMITTING MOTION
TO A GEAR
François Durand, 108 Blvd. Carnot,
Le Vesinet, Seine-et-Oise, France
Filed Mar. 21, 1967, Ser. No. 624,827
3 Claims. (Cl. 74—410)

ABSTRACT OF THE DISCLOSURE

A transmission having two input pinions in mesh with an output gear has movable support means for each pinion. The pinion support means are interconnected by mechanism which equalize the loads applied to each pinion.

This invention relates to a device for transmitting motion through a pinion to a gear of relatively large size. More precisely, this invention has for its object to provide a transmission device for driving a gear by means of at least two pinions meshing in driving relation therewith, this being furthermore accomplished with automatic adjustment of the manner in which the teeth of each pinion mesh with those of said gear.

In this connection, the conditions for correct meshing between an involute pinion and gear are well known, being as follows:

(1) The theoretical axes of the meshing teeth must line in the same plane.

(2) Said axes must be parallel to each other in that plane.

(3) The distance between the two axes can vary within the limits compatible with variations in backlash.

When a gear is driven by a single pinion, the tooth running-in process and the elastic deformations of the gear and pinion mountings will enable the three above-mentioned requirements to be fulfilled if they are not met at the outset. However, when two pinions are provided to drive the same gear, it is no longer possible to rely on the tooth running-in process, for although the latter may bring about the desired result on the teeth of one pinion it will generally not do so in the case of the other pinion.

The present invention has accordingly for its object to overcome this drawback and to ensure that each pinion of a two-pinion transmission system assumes the ideal position which allows it to satisfy the three requirements cited hereinbefore independently of the other pinion, this being achieved without setting up undue parasite (static) stresses as the result of elastic deformations of the supporting structure or of the mountings used for the gear and the pinions.

With this end in view the pesent invention is concerned with a device for transmitting motion to a relatively large gear which comprises at least two driving pinions each mounted in a movable support independent of the gear but provided with at least one roller concentric to the relevant pinion and in constant rolling engagement with the gear teeth. Each support is held against tangential motion by a coupling rod pivoted at either end on the one hand to the corresponding support and on the other hand to a fixed point by means of universal joints.

This device is characterised in that the supports of said two pinions are interconnected by at least two tie-rods mounted by means of universal joints, said tie-rods being disposed on either side of the plane containing the axis of said gear and the axes of said two pinions, and on either side of the faces of said gear, suitable abutment means limiting on the other hand the amplitude of the permissible movements of at least one of said support.

According to an advantageous form of embodiment, means are also provided for automatically apportioning the stress borne by said two driving pinions.

These means comprise a pair of bars assembled by a connecting link, and the coupling rods holding the pinion supports against tangential motion are pivoted not directly to fixed points but to one and the other of the bars of said stress apportioning means which are pivoted in turn to fixed points at their end opposite to the end connected to said connecting link.

Other features and advantages of the device of this invention will appear as the following description proceeds with reference to the accompanying drawing illustrating diagrammatically by way of example a typical form of embodiment of the invention. In the drawing:

FIGURE 1 is a part-elevational, part-sectional view of the device;

FIGURE 2 is a section taken upon the line II—II of FIGURE 1;

FIGURE 3 is another section taken upon the line III—III of FIGURE 2; and

FIGURE 4 is a fragmentary elevational view showing a modified form of embodiment.

The transmission device illustrated in the drawing is designed to drive a gear 1 supported on a shaft 2, through the medium of two pinions 3a and 3b. Said pinions are disposed on either side of the gear, in diametrically opposed positions on a diameter x–y of said gear. They are respectively driven by shafts 4a and 4b supported in cradle-shaped mountings 7a and 7b respectively, said shafts 4a and 4b being journaled in said mountings.

Each shaft 4a (or 4b) supports, on either side of the corresponding pinion 3a (or 3b), two rollers 5 positioned in contact with two giuding tracks 6 which are provided on the periphery of gear 1 and arranged on each side of the gear toothed rim 1a. Said two guiding tracks are disposed concentrically with said rim and the sum of the diameters of each roller 5 and its associated track 6 is equal to the sum of the pitch diameters of the pinion 3a (or 3b) and the gear 1.

Each cradle-like support 7a and 7b is held against motion in the tangent direction by coupling rods 10a and 10b respectively, each coupling rod having one end pivotally attached at 11 to the corresponding support through universal joint means, for example of the ball-and-socket type, and the opposite end pivoted to a fixed point by means of another universal joint.

However, in a particularly advantageous form of embodiment of this device the two coupling rods 10a and 10b are pivoted to bars 8a, 8b forming an integral part of a system for automatically apportioning the stress among the two driving pinions. These two bars are interconnected by a connecting cross-rod 9 on which their relevant ends are slidably mounted.

Stacked spring washers 15 are interposed between the ends of the two bars 8a and 8b. Besides, other similar spring washers are interposed between these ends and a plate 16 supporting the weight of both supports 7a, 7b and also of the pair of driving pinions 3a, 3b mounted therein. This plate is also mounted on the cross-rod 9 which carries an abutment at either end.

On the other hand, the plate 16 is suspended from a fixed case 17 by means of a pair of traction springs 19 disposed on either side of the cross-rod 9. However, coil compression springs may be substituted, if desired, for the traction springs 19.

The ends 12 of both coupling rods 10a, 10b are connected through universal or ball-and-socket joints to the ends of bars 8a and 8b disposed on the side opposite to said connecting and compensation system. The relevant ends of these two bars 8a, 8b are pivotally connected in turn, through the medium of ball-and-socket joints, to fixed points 20.

The two cradle-like supports 7a, 7b are interconnected by a pair of tie-rods 18a, 18b. These tie-rods are disposed on either side of the plane containing the axis x–y extending at right angles to the axis of the shaft 2 of toothed wheel 1 and the axes of both pinions 3a and 3b (see FIGURE 1). However, these tie-rods are also disposed on either side of the two faces of gear 1 (see FIGURE 2). The ends of these two tie-rods are pivotally attached to the cradle-like supports 7a, 7b by means of universal joints, for example ball-and-socket joints 21.

Moreover, an abutment system is provided for limiting the amplitude of the movements of at least one of the two cradle-like supports 7a and 7b. Thus, in the example illustrated an abutment system is contemplated which is adapted to limit the amplitude of the movements of support 7a, this system comprising a U-shaped member 22 carried by the coupling rod 10a, the two arms of this member 22 being disposed on either side of a lug 23 rigid with the support 7a. Thus, this member is positively capable of limiting the amplitude of the movements of support 7a. However, since this support 7a is connected through the tie-rods 18a, 18b to the other support 7b, the amplitude of the movements of this other support is similarly limited.

The shafts 4a and 4b of pinions 3a and 3b respectively may be driven from a single power shaft 24 through a worm and wheel reduction gearing 25. The output shaft of this reduction gearing is coupled to the shaft 4b of pinion 3b through the medium of a transmission mechanism of the worm and wheel type. Besides, the output shaft of reduction gearing 25 is coupled to another shaft 27 leading to another worm and wheel reduction gearing to couple same with the shaft 4a of pinion 3b. Coupling joints 28 are provided at both ends of the connecting shaft 27.

With this mounting the cradle-like structure 7a or 7b supporting each pinion has a sufficient freedom of movement to be able to position itself in such a manner that the relevant pinion lies in the ideal position for meeting the three requirements characterizing a satisfactory meshing engagement between the pinion and the teeth of the large gear.

It may be noted that each pinion and its support are properly positioned automatically until the requirements characterizing a satisfactory meshing engagement are met. Thereafter the teeth of each pinion bear as perfectly as desired against the teeth of the large gear 1. It may be noted that the orientation of each support may be altered by pivoting same about the corresponding coupling rod, thus holding this support against tangential movement, this rod being pivoted in turn at its opposite end 12.

Of course, during the operation of the transmission mechanism according to this invention both tie-rods 18a and 18b counteract the forces tending to move each pinion away from the driven gear.

Besides, the abutment system 22, 23 counteracts on the other hand the reaction torques of cradle-like structure 7a and also the reaction torques of cradle-like structure 7b, as a consequence of the operative connection provided between this structure 7b and the other supporting structure 7a through said pair of tie-rods 18a and 18b.

Finally, the connecting means provided between the two coupling rods 10a and 10b are adapted automatically to apportion the stresses received by the two driving pinions. In fact, should one of these pinions receive more stress than the other, the stress difference would be transmitted to the other pinion through the medium of bars 8a and 8b and their connecting means, until the stresses are automatically and evenly distributed among the two driving pinions.

FIGURE 4 illustrates a modified form of embodiment of the stress distributing system. In this alternate structure the coupling rods 10a and 10b are pivoted to a pair of bars 8c and 8d interconnected by a connecting link 30. This link 30 has its two ends 31 pivotally mounted on said bars 8c and 8d. At their opposite ends, these bars are pivoted to a pair of fixed points 20.

What I claim is:

1. A device for transmitting motion to a relatively large gear having peripheral teeth, which comprises in combination at least two driving pinions disposed at spaced intervals about said gear and in meshing engagement with the gear teeth, at least two supports independent of each other, each pinion being rotatably mounted in one of said supports, at least one track formed on said gear concentrically to its teeth, at least one roller mounted in each one of said supports concentrically to the relevant driving pinion and constantly engaging said gear track, a coupling rod connecting each one of said supports to a fixed point and adapted to hold each support against tangential movement with respect to said gear, each coupling bar being pivoted at both ends respectively to the relevant support and to the fixed point corresponding to said support, a pair of tie-rods interconnecting said supports and disposed on either side of a plane containing the axis of said gear and the axes of said driving pinions, and on either side of the two faces of said gear, and abutment means coacting with at least one of said supports for limiting the amplitude of its movements.

2. A transmission device as set forth in claim 1, wherein the relevant end of each coupling bar is pivoted to a fixed point through the medium of a cradle-like structure on which it is pivoted and which is pivoted in turn to said fixed point, the two corresponding bars being interconnected through a connecting rod having its two ends pivoted to said bars.

3. A transmission device as set forth in claim 1, wherein the relevant end of each coupling bar is pivoted to a fixed point through the medium of a bar to which it is pivoted and which is pivoted in turn to said fixed point, the two corresponding bars being interconnected by a connecting rod on which they are slidably mounted with the interposition of spring means bearing against a plate adapted to receive the weight of said driving pinions and of their supports, other spring means being interposed between said plate and a fixed support.

References Cited
UNITED STATES PATENTS

| | | | |
|---|---|---|---|
| 3,149,499 | 9/1964 | Schmitter | 74—410 X |
| 3,151,502 | 10/1964 | Kron et al. | 74—665 |
| 3,167,975 | 2/1965 | Durand | 74—410 X |
| 3,299,729 | 1/1967 | Durand | 74—410 X |
| 3,333,801 | 8/1967 | Falk | 74—665 |

FRED C. MATTERN, Jr., *Primary Examiner.*

LEONARD H. GERIN, *Assistant Examiner.*